United States Patent [19]
Holloway

[11] Patent Number: 5,460,351
[45] Date of Patent: Oct. 24, 1995

[54] VALVE STEM LOCKING ASSEMBLY

[75] Inventor: David G. Holloway, Deerfield, N.H.

[73] Assignee: Parker & Harper Companies, Inc., Raymond, N.H.

[21] Appl. No.: 287,077

[22] Filed: Aug. 8, 1994

[51] Int. Cl.[6] .......................... F15K 41/04; F16B 39/28; F16B 39/282
[52] U.S. Cl. .................... 251/214; 251/315.01; 277/112; 403/41; 411/7; 411/120
[58] Field of Search ................... 252/89, 95, 214, 252/315 R; 411/7, 120, 544; 277/110, 111, 112

[56] References Cited

U.S. PATENT DOCUMENTS

| | | | |
|---|---|---|---|
| H32 | 3/1986 | Kartik et al. | 411/120 |
| 531,024 | 12/1894 | Dolan | 411/120 |
| 1,190,318 | 7/1916 | Nelson | 411/120 |
| 1,406,331 | 2/1922 | Bartelt | 81/13 |
| 1,893,645 | 1/1933 | Godfrey, Jr. | 81/13 |
| 2,295,466 | 9/1942 | Hafele | 411/120 |
| 3,030,068 | 4/1962 | Priese | 251/214 |
| 3,231,235 | 1/1966 | Anderson et al. | 251/214 |
| 3,239,191 | 3/1966 | Widera | 251/214 |
| 3,273,443 | 9/1966 | Rubin | 411/7 |
| 3,425,314 | 2/1969 | Ohlson | 411/7 |
| 3,445,087 | 5/1969 | Priese et al. | 251/214 |
| 3,731,559 | 5/1973 | Krupke | 81/9.24 |
| 3,744,752 | 7/1973 | Massey | 251/292 |
| 3,877,339 | 4/1975 | Muenchinger | 411/544 |
| 4,534,101 | 8/1985 | Rosan, Jr. | 411/120 |
| 4,558,790 | 9/1985 | Williams et al. | 251/214 |
| 4,558,874 | 12/1985 | Williams et al. | 251/214 |
| 4,690,365 | 9/1987 | Miller et al. | 411/544 |
| 4,692,075 | 9/1987 | Metz | 411/7 |
| 4,792,118 | 12/1988 | Yusko et al. | 251/214 |
| 4,911,408 | 3/1990 | Kemp | 251/214 |
| 4,940,208 | 7/1990 | Kemp | 251/214 |
| 5,064,167 | 11/1991 | DiPalma | 251/214 |
| 5,104,092 | 4/1992 | Block et al. | 251/214 |
| 5,170,991 | 12/1992 | Heil | 277/112 |

Primary Examiner—George A. Walton
Attorney, Agent, or Firm—Davis, Bujold & Streck

[57] ABSTRACT

The invention provides a valve stem locking assembly for releasably locking a threaded fastener relative to a valve stem of a quarter-turn valve such as a ball valve. The assembly includes a handle defining an opening shaped to engage a corresponding shape of the valve stem to preclude relative rotation therebetween while allowing relative motion therebetween along the longitudinal axis of the valve stem. A standard nut engages the handle and is threaded onto the valve stem for movement relative to the valve stem along the axis. A spring biases the nut and the handle into relative rotation resisting engagement with each other. A camming mechanism, defined by the handle and the chamfer of the nut, is biased by the spring to prevent relative rotation therebetween until a desired torque about the axis is applied to the nut relative to the handle. When the nut is turned, the camming mechanism overcomes the rotation resisting engagement and pushes the handle along the valve stem axis against the bias of the spring. The nut then becomes free to rotate relative to the handle until the nut and the handle reengage.

15 Claims, 7 Drawing Sheets

VALVE STEM LOCKING ASSEMBLY

This invention relates to an assembly for preventing threaded fasteners for stems of fluid control valves from loosening once a desired clamping force has been achieved. In particular, though not exclusively, the assembly comprises a nut resiliently biased within a recess of the valve handle. As the nut is tightened or loosened, it automatically depresses the handle against the resilient bias so as to free the nut from the recess thereby allowing the nut to turn.

BACKGROUND OF THE INVENTION

The problem of loosening in service with attendant loss of clamping force, commonly encountered with threaded assemblies, is aggravated when the externally threaded member carries only a partial thread. Valve users fall prey to this problem as it is common practice to machine flats on threaded valve stems.

Prior art locknuts which bear on the thread profile suffer a significant loss of effectiveness when deprived of a full external mating thread. Although lockwashers are effective in certain applications, their use imposes minimums on clamping force; minimums which may result in undesirably high levels of compressive force applied to the finished assembly (as with a ball-valve stem and seal arrangement).

OBJECT OF THE INVENTION

Accordingly, it is an objective of the present invention to provide an assembly for preventing loosening of a nut.

Another objective of the invention is to provide a handle having a recess to contain the nut thereby preventing rotation of the nut.

Another objective of the invention is to provide an assembly capable of depressing the valve handle thereby freeing the nut from the recess in the handle allowing the nut to turn.

Another objective of the invention is to provide an assembly which uses a single resilient bias to lock a nut and to load a seal in the valve.

SUMMARY OF THE INVENTION

According to the invention there is provided a valve stem locking assembly for releasably locking a threaded fastener relative to a valve stem of a quarter-turn valve comprising a valve stem defining a longitudinal axis; a handle means defining an opening shaped to engage a corresponding shape of the stem to preclude relative rotation therebetween while allowing relative motion therebetween along the axis; a fastener engaging the handle means and in threaded engagement with the stem for movement relative to the stem along the axis; means resiliently biasing the fastener and the handle means into relative rotation resisting engagement with each other; and, camming means, defined by the handle means and the fastener, biased by the resilient means to prevent relative rotation therebetween until a desired torque about the axis is applied to the fastener relative to the handle means to actuate the camming means to overcome said resilient bias and turn the fastener relative to the handle means.

According to the invention there is also provided a valve stem locking assembly for releasably locking a standard nut relative to a valve stem of a quarter-turn valve comprising a valve stem defining a longitudinal axis; a standard nut having outer faces joined to an end face by a frusto-conical chamfer; a handle having a recess and a shaped hole to engage a corresponding shape of the stem to preclude relative rotation therebetween while allowing relative motion therebetween along the axis, said recess being centered about the axis and having a plurality of walls spaced a distance away from the axis sufficient to engage the outer faces of said standard nut, the outer faces of the nut engaging the recess walls and the nut being threaded onto the stem for movement relative to the stem along the axis; a Belleville spring resiliently biasing the nut and the handle into said engagement; and, camming means, defined by said recess and said chamfer, biased by said Belleville spring to prevent relative rotation therebetween until a desired torque about the axis is applied to the nut relative to the handle to actuate the camming means to overcome the resilient bias of said Belleville spring and turn the nut relative to the handle, said end face of said nut lying substantially perpendicular to said axis, said recess walls having a height, as measured along said axis, less than the height of said chamfer, as measured along said axis, said camming means providing means for adjusting and maintaining sealing force of the valve stem.

According to the invention there is also provided a valve handle for a quarter-turn valve having a valve stem defining a shaped hole, disposed about an axis, for engaging a corresponding shape of the valve stem to preclude relative rotation therebetween while allowing relative motion therebetween along the axis, and a recess being centered on said axis and encompassing said shaped hole, said recess defining a plurality of walls to be engaged by an outer face of a chosen standard nut, said walls having a height along said axis less than the height of an end chamfer of the chosen standard nut along said axis, said walls being parallel to the outer face of the chosen standard nut and being spaced a distance away from said axis sufficient to engage the outer face of the chosen standard nut.

According to the invention there is also provided a valve comprising a valve housing having an inlet chamber and an outlet chamber; a flow control device being disposed between said inlet and outlet chambers for sealingly restricting fluid flow between said chambers; a valve stem defining a longitudinal axis and attached to said flow control device; a handle means defining an opening shaped to engage a corresponding shape of the stem to preclude relative rotation therebetween while allowing relative motion therebetween along the axis; a fastener engaging the handle means and in threaded engagement with the stem for movement relative to the stem along the axis; means resiliently biasing the fastener and the handle means into relative rotation resisting engagement with each other; and, camming means, defined by the handle means and the fastener, biased by the resilient means to prevent relative rotation therebetween until a desired torque about the axis is applied to the fastener relative to the handle means to actuate the camming means to overcome said resilient bias and turn the fastener relative to the handle means.

BRIEF INTRODUCTION TO THE DRAWINGS

The invention will now be described, by way of example, with reference to the accompanying drawings, in which.

DETAILED DESCRIPTION OF THE INVENTION

Figure 1:
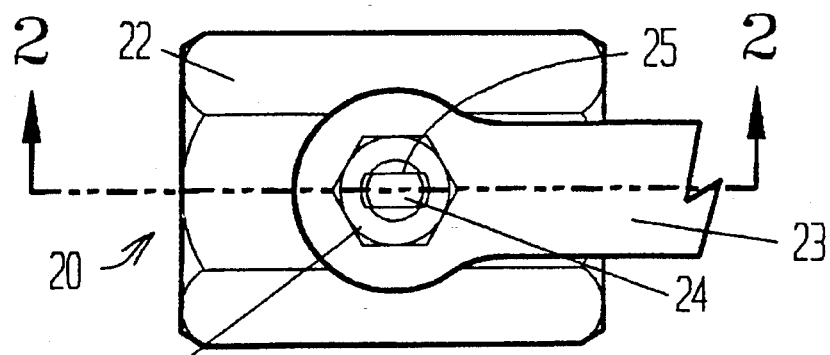
FIG. 1 is a plan view of a prior art assembly showing a valve handle secured to a valve stem of a valve.
Figure 2:
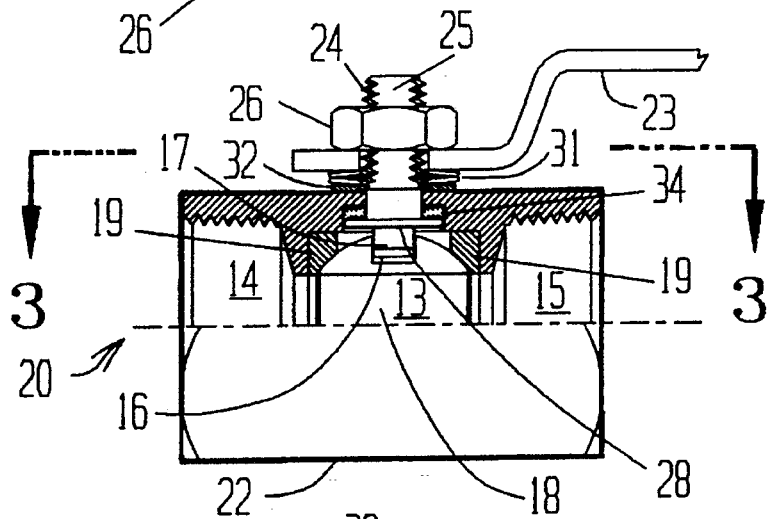
FIG. 2 is a partial section view of the prior art assembly taken on section line 2—2 of FIG. 1.
Figure 3:
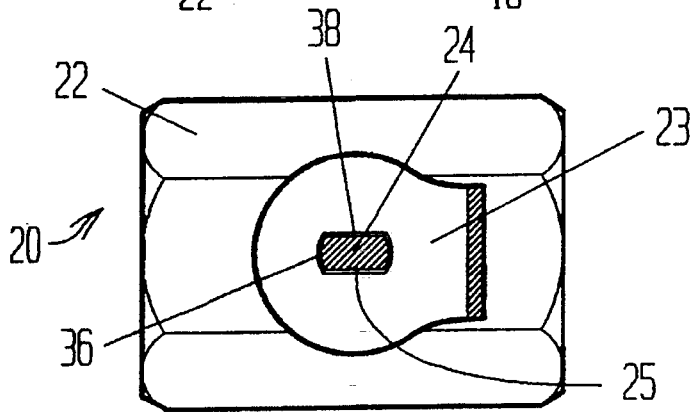
FIG. 3 is a section view of the prior art assembly taken on section line 3—3 of FIG. 2 showing a shaped hole in the handle to accept the flats of the valve stem.
Figure 4:
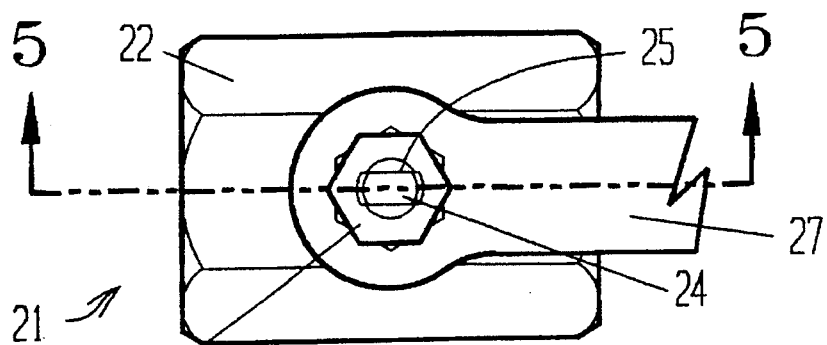
FIG. 4 is a top plan view of the present invention showing the valve handle secured to the valve stem of a valve.
Figure 5:
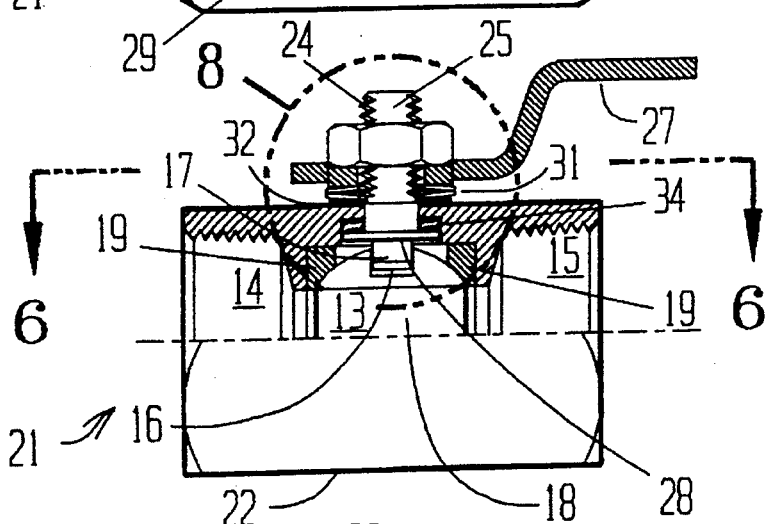
FIG. 5 is a partial section view of the present invention taken on section line 5—5 of FIG. 4.
Figure 6:
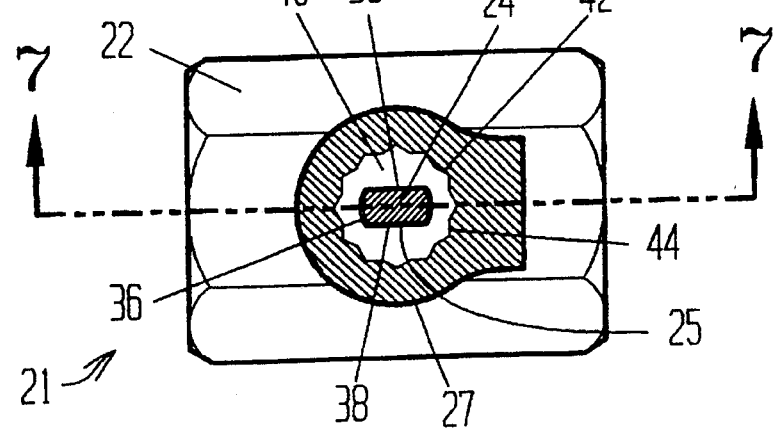
FIG. 6 is a section view of the present invention taken on section line 6—6 of FIG. 5 showing a recess in the handle to accept the nut.
Figure 7:
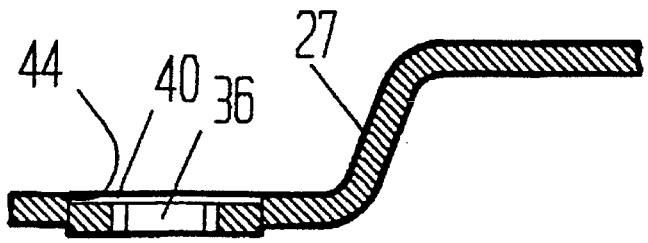
FIG. 7 is a section view of the handle taken on section line 7—7 of FIG. 6.

Turning first to FIGS. 1–3, a conventional quarter-turn rotatory-valve stem assembly 20 is shown. Such assemblies are used, for example, in standard ball valves. The assembly 20 is made up by inserting the valve stem 24 with stem seal 34 from within the valve body 22 through a hole in the wall of the valve body 22. This construction known as a "blow-out-proof" stem in the valve industry. A thrustbearing 32, a pair of Belleville springs 31 and the handle 23 are placed over the protruding end of the valve stem 24, then secured with a locknut 26 tightened sufficiently to assure an effective seal between the valve stem 24 and valve body 22. Valve stem tab 17 sealingly engages ball (flow control device) 18 with valve stem tab seal 16.

In operation, the handle 23 is turned to open or close the valve assembly 20, the valve stem 24 being carried with the handle 23 driven through the mating shaped hole 36, having hole flats 38 which bear on the valve stem flats 25. As the valve stem tab 17 rotates, ball 18 rotates into a position to either allow or prevent fluid flow communication between chamber 14 and chamber 15 via port 13. Ball seal 19 provides added sealing to prevent fluid leakage from chamber 14 to chamber 15 or vice-versa. As the seal 34 wears, sealing effectiveness is sustained by the Belleville springs 31 which maintain clamping force between the valve stem hub 28, stem seal 34 and valve 22. Unfortunately, since a small clearance must be provided between the valve stem 24 and handle 23, a "chucking" occurs as the valve assembly 20 is operated, which causes the locknut 26 gradually to loosen necessitating periodic re-tightening to avoid leakage.

If the Belleville springs 31 have been fully compressed (flattened) through over-tightening of the locknut 26, they no longer serve to moderate the load imposed on the seal 34. Further tightening will sharply increase the load and raise the possibility of damage to the stem seal 34 or other components.

Turning now to FIGS. 4–7, a quarter-turn, rotary-valve stem assembly 21 is shown constructed in accordance with the present inventive concepts. Similar to the prior art assembly 20, the present invention 21 is made up by inserting the valve stem 24, with seal 34, from within the valve body 22 through a hole in the wall of the valve body 22.

The thrustbearing 32, the Belleville springs 31 and the handle 27 are placed over the protruding end of the valve stem 24, then secured with a nut 29 tightened sufficiently to assure an effective seal between the valve stem 24 and valve body 22. Valve stem tab 17 sealingly engages ball 18 with valve stem tab seal 16.

In similar operation, the handle 27 is turned to open or close the valve assembly 20, the valve stem 24 being carried with the handle 27 driven through the mating shaped hole 36, having hole flats 38 which bear on the valve stem flats 25. As the valve stem tab 17 rotates, ball 18 rotates into a position to allow or prevent fluid flow communication between chamber 14 and chamber 15 via port 13. Ball seal 19 provides added sealing to prevent fluid leakage from chamber 14 to chamber 15 or vice-versa. As the stem seal 34 wears, sealing effectiveness is sustained by the Belleville springs 31 which maintain clamping force between the valve stem hub 28, stem seal 34 and valve body 22.

However, to prevent the nut 29 from loosening during repeated operation, the handle 27 is made with a recess 40, in the shape of a socket 42 having recess walls 44 which engage the outer faces of the nut 29. Of course, the recess 40 need not be below the face of nor integral with the handle 27. The recess may be embodied in a separate washer type device precluded from relative rotation with respect to the valve stem 24 and handle 27 via, for example, a shaped hole 36 and located between the nut 29 and handle 27 as detailed further with reference to FIG. 14. Also, the nut 29 need not be a locknut as is used in the prior art assembly of FIGS. 1–3, but may be any standard nut having a chamfer 46 (see FIG. 9) on at least one face as will be explained hereinafter. The recess 40 is represented as a 12-point socket 42, however, as will be apparent to the skilled artisan, a 6-point socket may be used. Indeed, any multiple of six may be used as well as a recess with one, two or three nut engaging flats.

As the nut 29 is tightened past the point at which the Belleville springs 31 contact the handle 27, the nut 29 will ride into and out of engagement with the socket 42. The disengagement of the nut 29 from the socket 42 is facilitated by the chamfer 46 on the nut 29. When the assembly is complete and the desired clamping force has been reached, the nut 29 is resiliently located relative to the handle 27 by its engagement with the socket 42. In service, the nut 29 will not tend to loosen as the valve assembly 21 is operated, but will remain in its original position until deliberately re-positioned through use of a wrench.

Figure 8:
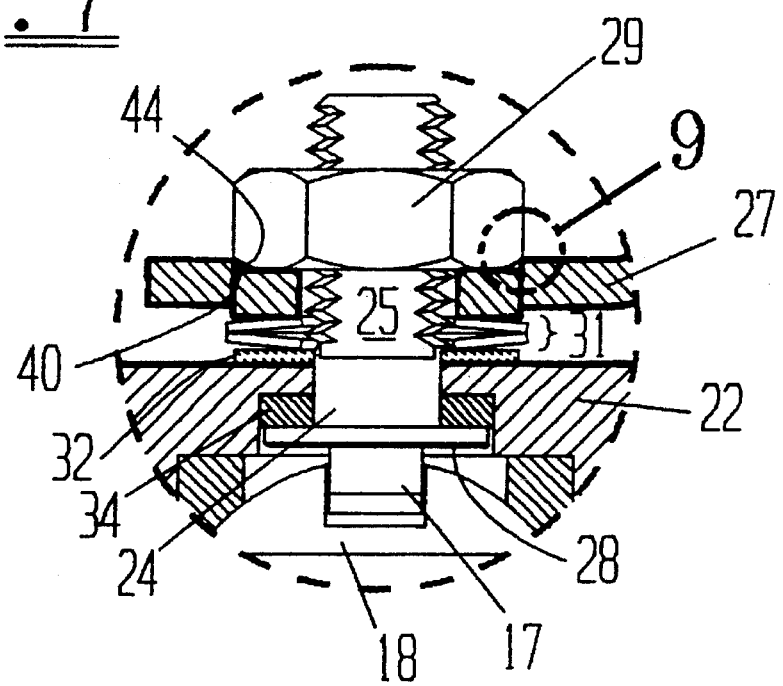
FIG. 8 is an enlarged view encircled by line 8 of FIG. 5.
Figure 9:
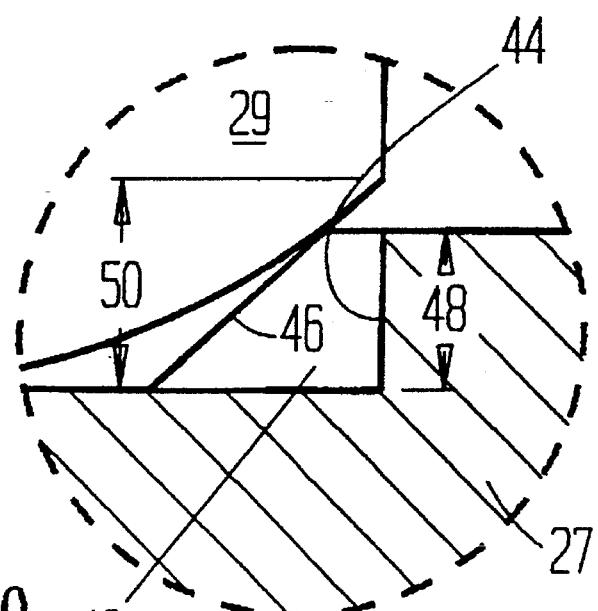
FIG. 9 is an enlarged view of the present invention encircled by line 9 of FIG. 8 showing the nut within the recess of the handle.
Figure 10:
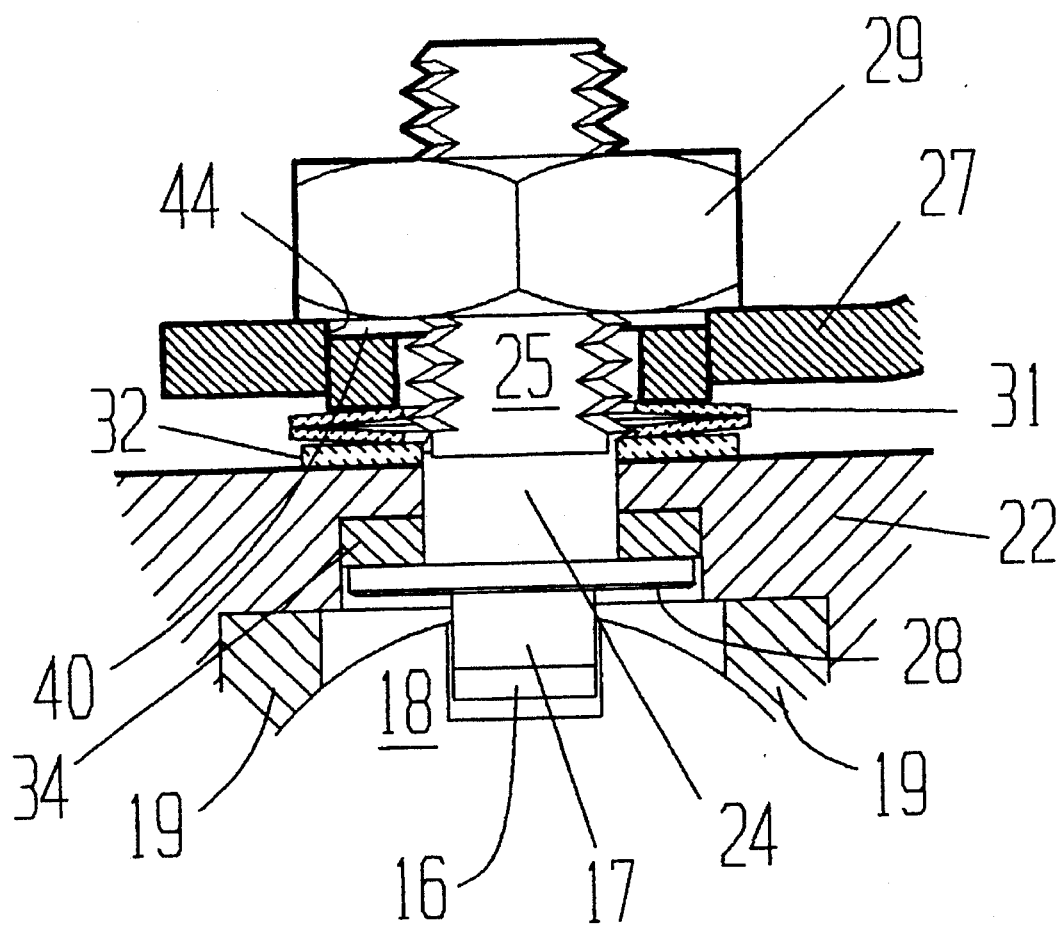
FIG. 10 is an enlarged view of the present invention similar to that of FIG. 8, showing the nut disengaged from the handle as the handle depresses the springs.

Turning now to FIGS. 8–10, there is shown an enlarged view of the nut 29 engaged within the recess 40 of handle 27. In order to facilitate disengagement of the nut 29 from the recess 40, the chamfer height (axial chamfer extent) 50 of the nut 29 is greater than the depth 48 of the recess 40. As the nut 29 is rotated relative to the handle 27, the chamfer 46 presses against the top of the recess walls 44 causing a "camming" action which, in turn, causes the handle 27 to press against the Belleville springs 31. This causes the handle 27 to move in a downward axial direction with respect to the valve stem 24 thereby allowing the nut 29 to rotate freely as seen in FIG. 10. Here, the nut 29 is in a position between two adjacent engaging positions and is disengaged from the handle 27. As the nut 29 continues to rotate, it comes upon the adjacent recess wall 44 of the recess 40 and thus engages the handle 27 once again by the spring action of the Belleville springs 31 pushing the handle upward.

If tightening of the nut 29 continues until the Belleville springs 31 closely approach full compression, a point will be reached at which full compression (solid height) will be achieved during the process of "camming" the nut 29 free of recess 40 of the handle 27. The nut 29 cannot be tightened further as the handle 27 is no longer free to move axially downward so as to release the nut 29 fully from the recess 40. The load which can be imposed on the stem seal 34 and other components of the assembly 21 through over-tightening is thereby controlled.

Figure 11:
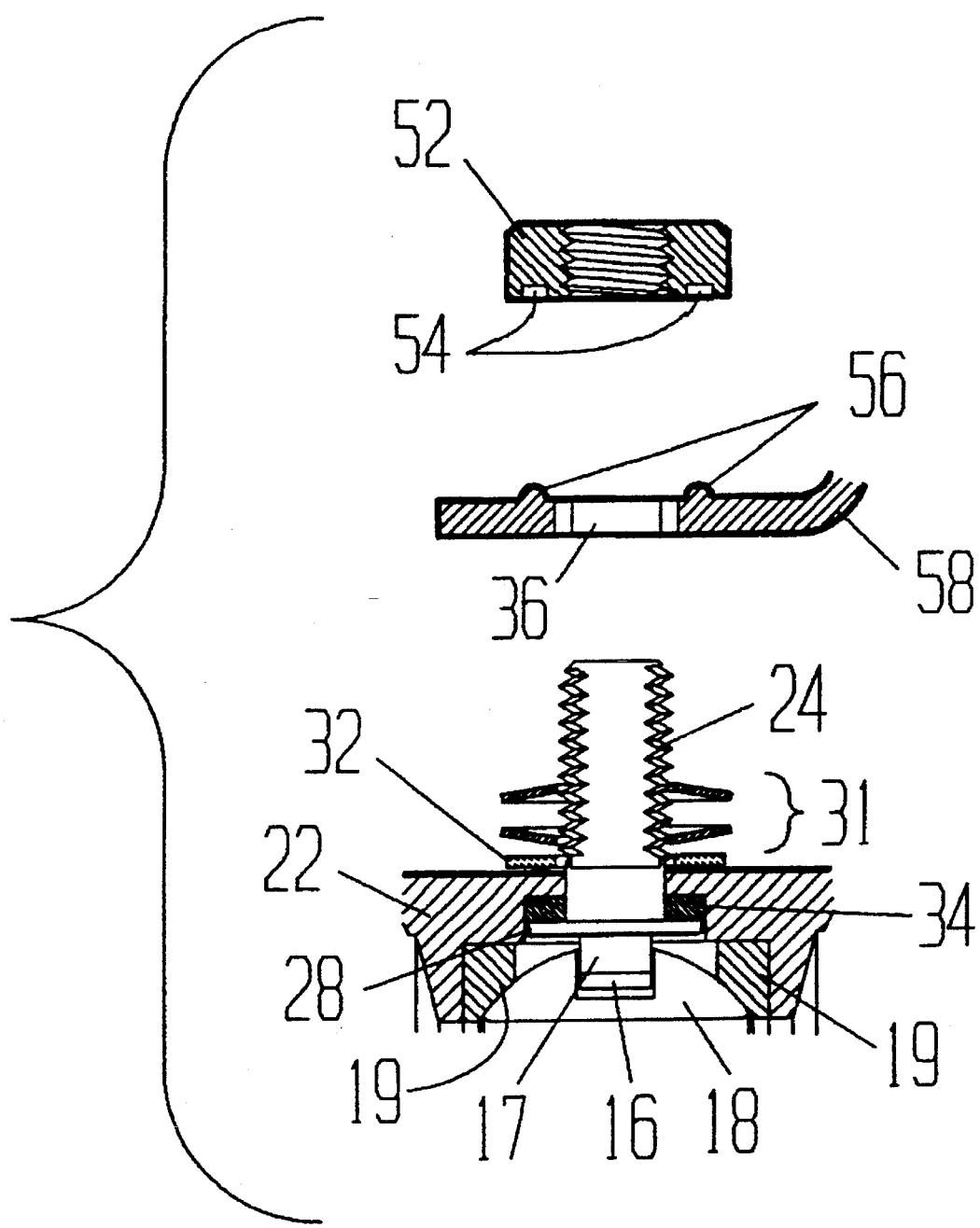
FIG. 11 is a partial exploded section view of a second embodiment of the present invention on a section similar to 5—5 of FIG. 4.

Turning now to FIG. 11, there is shown a second embodiment of the present invention. A nut 52 may carry projections 54 in its bearing surface which engage mating recesses 56 provided in the handle 58. Conversely, the nut may carry the mating recesses 56 and the handle may carry the projections 54. The nut 52 engages valve stem 24 with seal 34, valve body 22, thrustbearing 32, Belleville springs 31 and handle 58 located therebetween. As the nut 52 is tightened onto valve stem 24, stem hub 28 provides adequate pressure on stem seal 34 to assure an effective seal between the valve stem 24 and valve body 22 while at the same time providing an assembly which will not loosen with repeated turning of the handle 58.

Figures 12, 13:
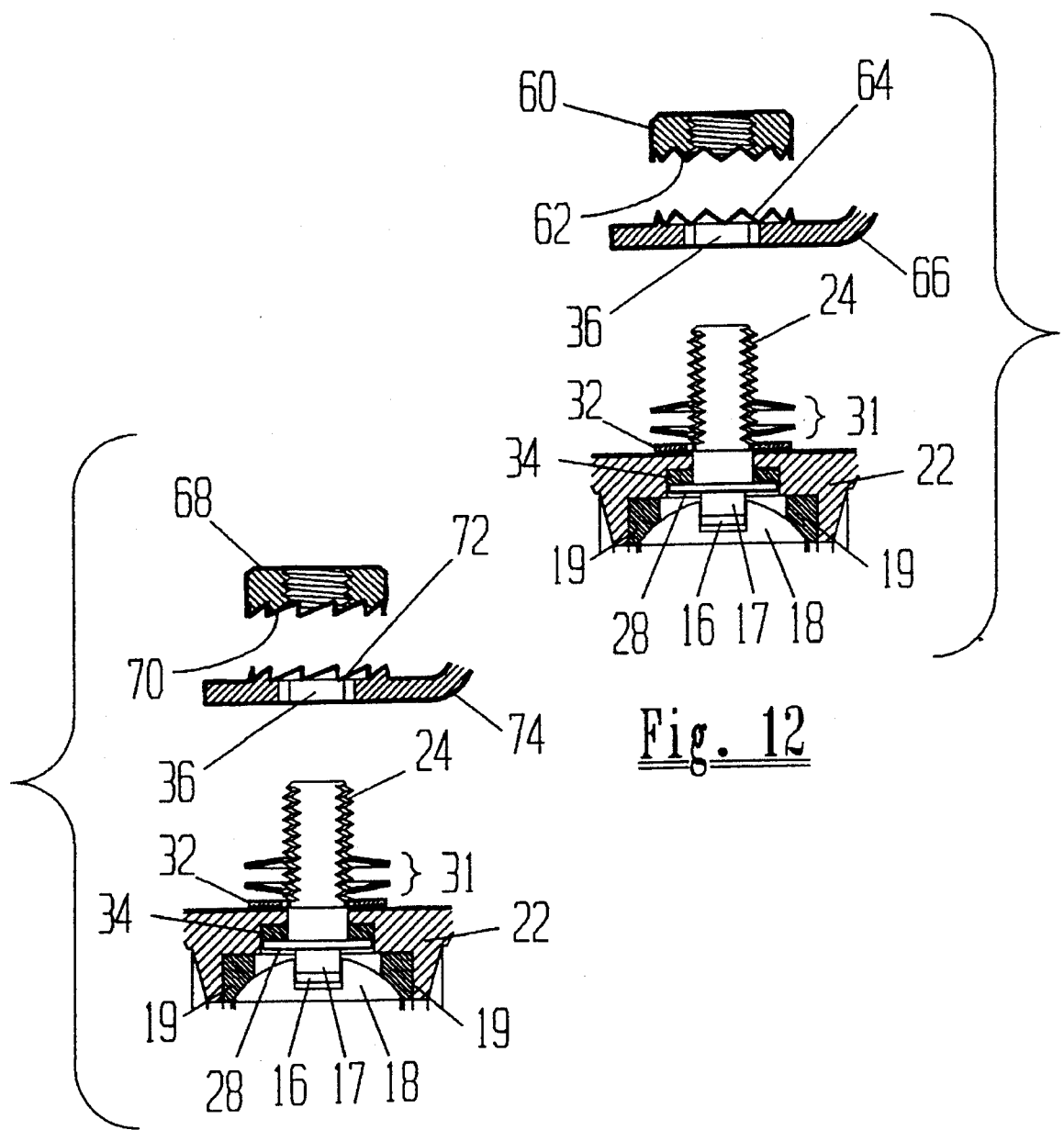
FIG. 12 is a partial exploded section view of a third embodiment of the present invention on a section similar to 5—5 of FIG. 4.
FIG. 13 is a partial exploded section view of a fourth embodiment of the present invention on a section similar to 5—5 of FIG. 4.

Turning now to FIG. 12, there is shown a third embodiment of the present invention. The nut 60 and the handle 66 may carry interlocking radially extending projections which are essentially identical, such as the bi-directional rachet teeth 62 and mating projections 64. The nut 60 engages valve stem 24 with seal 34, valve body 22, thrustbearing 32, Belleville springs 31 and handle 66 located therebetween. As the nut 60 is tightened onto valve stem 24, stem hub 28 provides adequate pressure on stem seal 34 to assure an effective seal between the valve stem 24 and valve body 22 while at the same time providing an assembly which will not loosen with repeated turning of the handle 66.

Turning now to FIG. 13, there is shown a fourth embodiment of the present invention. The nut 68 may carry interlocking projections as in the third embodiment, however, the projections are anti-backup teeth 70 and mating projections 72. This configuration permits tightening while preventing loosening. The nut 68 engages valve stem 24 with seal 34, valve body 22, thrustbearing 32, Belleville springs 31 and handle 74 located therebetween. As the nut 68 is tightened onto valve stem 34, stem hub 28 provides adequate pressure on stem seal 34 to assure an effective seal between the valve stem 24 and valve body 22 while at the same time providing an assembly which will not loosen with repeated turning of the handle 74.

Figure 14:
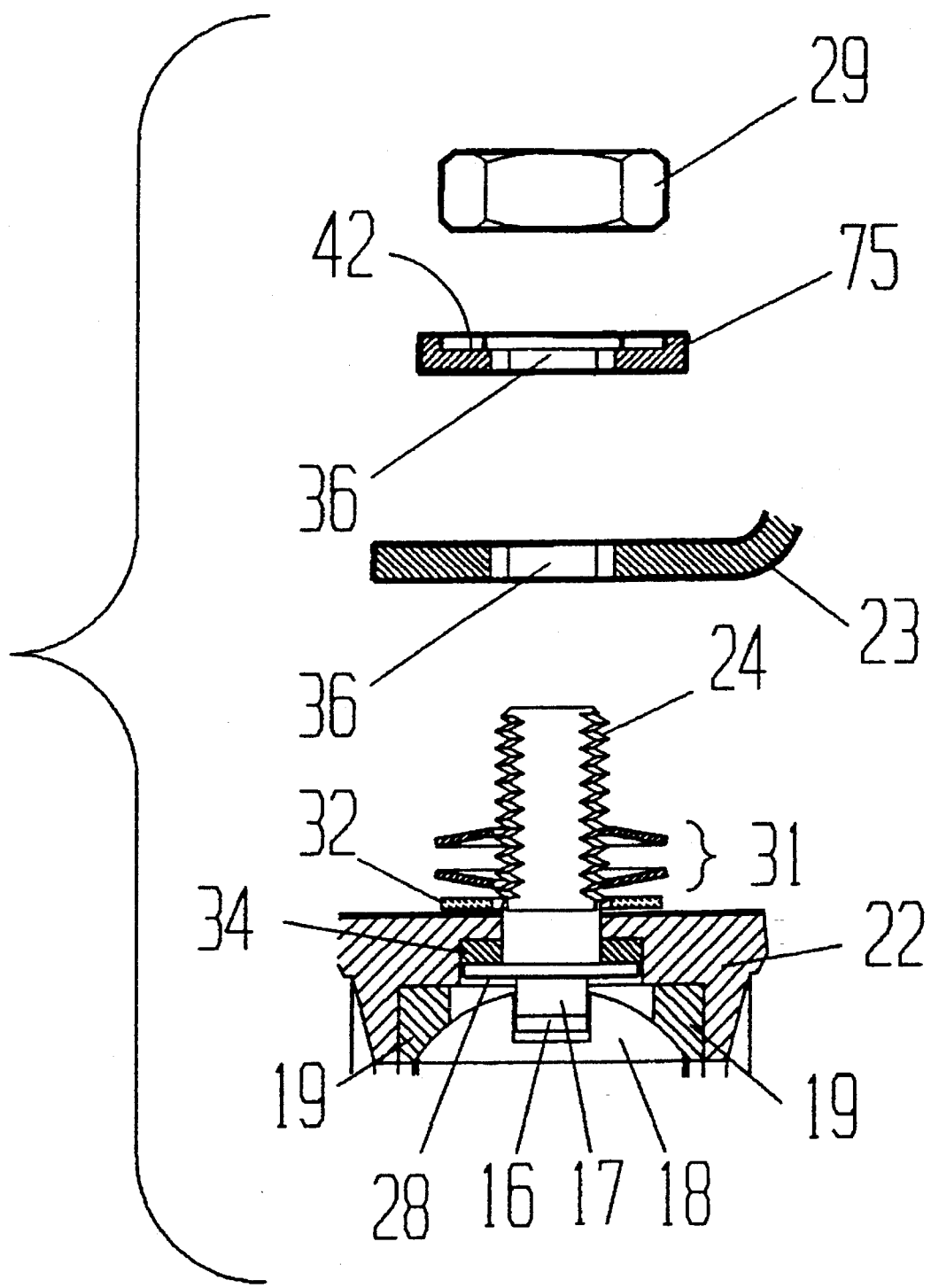
FIG. 14 is a partial exploded section view of a fifth embodiment of the present invention on a section similar to 5—5 of FIG. 4

Turning now to FIG. 14, there is shown a fifth embodiment of the present invention. Like elements of this embodiment and the previous embodiments are designated with the same reference numerals. A cam washer 75 may be located between a prior art handle 23 and nut 29. The cam washer 75 is precluded from relative rotation with respect to the valve stem 24 and handle 23 via, for example, a shaped hole 36. As the nut 29 is tightened or loosened past the point at which the Belleville springs 31 contact the handle 23, the nut will ride into and out of engagement with the socket 42 of cam washer 75. The disengagement is facilitated by a chamfer 46 provided on the nut 29 in similar fashion as described with reference to FIGS. 8 through 10.

As used in this specification and the attached claims, "handle means" shall be construed to include not only a single handle but also a handle assembly comprising a plurality of parts together performing the same functions as the handle herein described, for example, the handle 23 together with the cam washer 75 having a recess as described with reference to FIG. 14.

What is claimed is:

1. A valve stem locking assembly for releasably locking a threaded fastener relative to a valve stem of a quarter-turn valve comprising:

a valve stem defining a longitudinal axis;

a fastener;

a handle means defining an opening shaped to engage a corresponding shape of the stem to preclude relative rotation therebetween while allowing relative motion therebetween along the axis, said handle means being positioned on said valve stem whereby said opening is substantially coaxial with said valve stem, said handle means having a wall surface defining an edge transverse to said axis and extending beyond the surface of the fastener adjacent said handle means, said wall surface being spaced from said axis and positioned to engage a flat sidewall of said fastener;

said flat sidewall being being joined to an end face of said fastener, at least in part, by a frusto-conical surface and at least partially interrupting the frusto-conical surface to define a transition between the flat sidewall and the frusto/conical surface, at least a portion of said flat sidewall of said fastener engaging the wall surface of said handle means and said fastener being in threaded engagement with the stem for movement relative to the stem along the axis;

means resiliently biasing the fastener and the handle means; and, camming means, defined by the edge and the transition, biased by the resilient means to prevent relative rotation therebetween until a desired torque about the axis is applied to the fastener relative to the handle means to actuate the camming means to cause the transition to ride upon the edge to overcome said resilient bias thereby moving said handle means along said axis away from said fastener to allow said fastener to rotate until said at least a portion of said flat sidewall of said fastener reengages the wall surface of said handle means.

2. The valve stem locking assembly as claimed in claim 1 wherein said handle means is a handle having a recess defining at least one wall to be engaged by an outer face of the fastener, said wall being spaced a distance away from said axis sufficient to engage the outer face of said fastener.

3. The valve stem locking assembly as claimed in claim 2 wherein said fastener is a standard nut.

4. The valve stem locking assembly as claimed in claim 3 wherein said camming means comprises a chamfer between an end face of said nut and said outer face, said end face lying substantially perpendicular to said axis, said chamfer being adjacent said wall whereby said chamfer engages said wall when said nut is rotated about said axis thereby moving said handle along said axis away from said nut.

5. The valve stem locking assembly as claimed in claim 4 wherein said chamfer is a right frusto-conical surface defined by the outer face of said nut circumscribed about a circle on said end face of said nut and the outer face truncating said surface at a specified height from said face of said nut along said axis.

6. The valve stem locking assembly as claimed in claim 5 wherein the at least one wall of said recess has a height as measured along said axis less than a height of said chamfer of said nut as measured along said axis thereby allowing said chamfer to engage the top of said wall.

7. The valve stem locking assembly as claimed in claim 1 wherein said resilient means comprises a means for adjusting and maintaining sealing force of the valve stem by having a compressed height sufficient to prevent said fastener from disengaging said handle means thereby defining a maximum amount of said sealing force on the valve stem.

8. The valve stem locking assembly as claimed in claim 7 wherein said resilient means is at least one Belleville spring.

9. The valve stem locking assembly as claimed in claim 1 wherein said camming means comprises a plurality of radial circumferentially spaced inclined cooperating serrations thereby allowing said handle means to move along said axis away from said fastening means when said fastening means rotates about said axis.

10. The valve stem locking assembly as claimed in claim 9 wherein said serrations are anti-backup teeth.

11. The valve stem locking assembly as claimed in claim 1 wherein said camming means comprises a plurality of projections engaging mating recesses thereby allowing said handle means to move along said axis away from said fastening means when said fastening means rotates about said axis.

12. The valve stem locking assembly as claimed in claim 1 wherein said fastener is a standard nut having a chamferred end and said handle means comprises a handle and a handle washer precluded from rotation relative to said handle, said washer having a recess centered about said axis and defining a plurality of walls to be engaged by an outer face of the nut, said walls having a height along said axis less than the height of the chamfer of the nut along said axis, said walls being parallel to the outer face of the nut and being spaced a distance away from said axis sufficient to engage the outer face of the nut.

13. A valve stem locking assembly for releasably locking a standard nut relative to a valve stem of a quarter-turn valve comprising:

a valve stem defining a longitudinal axis;

a standard nut having outer faces joined to an end face, at least in part by a frusto-conical chamfer and at least partially interrupting said chamfer to define a transition between said outer face and said chamfer, said nut threadingly engaging said valve stem;

a handle having a recess and a shaped hole to engage a corresponding shape of the stem to preclude relative rotation therebetween while allowing relative motion therebetween along the axis, said handle being positioned on said valve stem whereby said recess is centered about the axis and has a plurality of wall s spaced a distance away from the axis sufficient to engage the outer faces of said standard nut, the outer faces of the nut engaging the recess walls and the nut being threaded onto the stem for movement relative to the stem along the axis;

a Belleville spring resiliently biasing the nut and the handle into said engagement; and, camming means, defined by the top of said recess wall and said transition, biased by said Belleville spring to prevent relative rotation therebetween until a desired torque about the axis is applied to the nut relative to the handle to actuate the camming means to overcome the resilient bias of said Belleville spring, said end face of said nut lying substantially perpendicular to said axis, said recess walls having a height, as measured along said axis, less than the height of said chamfer, as measured along said axis thereby allowing said transition to ride upon the top of said recess wall and move said handle along said axis away from said nut when said nut is rotated about said axis to allow said nut to rotate until an adjacent outer face of said nut engages an adjacent wall of said recess, said camming means providing means for adjusting and maintaining sealing force of the valve stem.

14. A valve handle for a quarter-turn valve having a valve stem defining a shaped hole, disposed about an axis, for engaging a corresponding shape of the valve stem to preclude relative rotation therebetween while allowing relative motion therebetween along the axis, and a recess being centered on said axis and encompassing said shaped hole, said recess defining a plurality of walls to be engaged by an outer face of a chosen standard nut, said walls having a height along said axis less than the height of an end chamfer of the chosen standard nut along said axis, said walls being parallel to the outer face of the chosen standard nut and being spaced a distance away from said axis sufficient to engage the outer face of the chosen standard nut, whereby said chamfer and said recess cooperate to define a camming means biased, in use, by a resilient means to prevent relative rotation between said handle and said nut until a desired torque about the axis is applied to the nut relative to the handle means to actuate the camming means tq cause the chamfer to ride upon the top of said recess wall to overcome said resilient bias thereby moving said handle along said axis away from said nut to allow said nut to rotate until said outer face of said out reengages the wall of said recess.

15. A valve comprising:

a valve housing having an inlet chamber and an outlet chamber;

a flow control device being disposed between said inlet and outlet chambers for sealingly restricting fluid flow between said chambers;

a valve stem defining a longitudinal axis and attached to said flow control device;

a fastener;

a handle means defining an opening shaped to engage a corresponding shape of the stem to preclude relative rotation therebetween while allowing relative motion therebetween along the axis, said handle means being positioned on said valve stem whereby said opening is substantially coaxial with said valve stems said handle means having a wall surface defining an edge transverse to said axis and extending beyond the surface of the fastener adjacent said handle means, said wall surface being spaced from said axis and positioned to engage a flat sidewall of said fastener;

said flat sidewall being joined to an end face of said fastener, at least in part, by a frusto-conical surface and at least partially interrupting the frusto-conical surface to define a transition between the flat sidewall and the frusto-conical surface, at least a portion of said flat sidewall of said fastener engaging the wall surface of said handle means and said fastener being in threaded engagement with the stem for movement relative to the stem along the axis;
means resiliently biasing the fastener and the handle means; and,
camming means, defined by the edge and the transition, biased by the resilient means to prevent relative rotation therebetween until a desired torque about the axis is applied to the fastener relative to the handle means to actuate the camming means to cause the transition to ride upon the edge to overcome said resilient bias thereby moving said handle means along said axis away from said fastener to allow said fastener to rotate until said at least a portion of said flat sidewall of said fastener reengages the wall surface of said handle means.

* * * * *